(12) United States Patent
Le Pellec

(10) Patent No.: US 9,441,741 B2
(45) Date of Patent: Sep. 13, 2016

(54) BALL VALVE HAVING AN EXTERNAL SEAL ARRANGEMENT, PARTICULARLY FOR USE IN MOTOR VEHICLE REFRIGERANT CIRCUITS

(71) Applicant: HALLA VISTEON CLIMATE CONTROL CORP., Daejeon-si (KR)

(72) Inventor: Corinne Le Pellec, Pulheim (DE)

(73) Assignee: HANON SYSTEMS, Daejeon-Si (KR)

( * ) Notice: Subject to any disclaimer, the term of this patent is extended or adjusted under 35 U.S.C. 154(b) by 225 days.

(21) Appl. No.: 14/361,919

(22) PCT Filed: Nov. 30, 2012

(86) PCT No.: PCT/EP2012/074151
§ 371 (c)(1),
(2) Date: May 30, 2014

(87) PCT Pub. No.: WO2013/079692
PCT Pub. Date: Jun. 6, 2013

(65) Prior Publication Data
US 2014/0306137 A1  Oct. 16, 2014

(30) Foreign Application Priority Data

Nov. 30, 2011 (DE) .......................... 10 2011 055 892
Nov. 27, 2012 (DE) .......................... 10 2012 111 467

(51) Int. Cl.
*F16K 5/06* (2006.01)
*F16K 41/00* (2006.01)
*F16K 41/10* (2006.01)

(52) U.S. Cl.
CPC ........... *F16K 5/0647* (2013.01); *F16K 5/0694* (2013.01); *F16K 41/003* (2013.01); *F16K 41/106* (2013.01)

(58) Field of Classification Search
CPC .. F16K 5/0647; F16K 41/106; F16K 41/003; F16K 5/0694
USPC ....................... 251/214, 335.2, 315.01, 315.1
See application file for complete search history.

(56) References Cited

U.S. PATENT DOCUMENTS 3,082,632 A * 3/1963 Vulliez ................... F16H 21/14
475/170
3,096,966 A * 7/1963 McFarland, Jr. ...... F16K 5/0647
251/214

(Continued)

FOREIGN PATENT DOCUMENTS

DE 2430409 A1 4/1975
EP 1467132 A1 10/2004

*Primary Examiner* — John Bastianelli
(74) *Attorney, Agent, or Firm* — Fraser Clemens Martin & Miller LLC; James D. Miller

(57) ABSTRACT

A ball valve (1), particularly for use in motor vehicle refrigerant circuits, having an actuator (2), a shaft (3) including a shaft bearing (5), a ball (4) including a ball passage (16), and a valve housing (13). A fluid shaft seal (8) is arranged in the shaft bearing (5) between an upper shaft seal (6) and a lower shaft seal (7), wherein the fluid shaft seal (8) is formed by a cavity (18) in which a sealing fluid is provided, and that the sealing fluid is in contact with the shaft (3) in a sealing region (19) such that the sealing fluid has a sealing effect in the axial direction, wherein the cavity (18) is at least partially formed by a diaphragm (11) and is limited on the shaft (3) by the shaft seals (6, 7), and that the diaphragm (11) is formed in such a way that pressure can be applied to the side facing away from the sealing fluid.

10 Claims, 3 Drawing Sheets

(56) References Cited

U.S. PATENT DOCUMENTS

| | | | |
|---|---|---|---|
| 3,406,707 A * | 10/1968 | Schenck, Jr. | F16K 5/025 |
| | | | 137/375 |
| 3,567,176 A * | 3/1971 | Johnson | F16K 5/0631 |
| | | | 251/172 |
| 4,475,713 A | 10/1984 | Reed et al. | |
| 5,402,983 A * | 4/1995 | Bernhardt | F16K 41/125 |
| | | | 251/214 |
| 6,640,823 B2 * | 11/2003 | Gonsior | F16K 5/0285 |
| | | | 137/15.18 |
| 2001/0032951 A1 | 10/2001 | Stewart | |
| 2009/0079138 A1 | 3/2009 | Keiser | |

* cited by examiner

BALL VALVE HAVING AN EXTERNAL SEAL ARRANGEMENT, PARTICULARLY FOR USE IN MOTOR VEHICLE REFRIGERANT CIRCUITS

CROSS-REFERENCE TO RELATED APPLICATIONS

This application is a United States national phase application based on PCT/EP2012/074151 filed Nov. 30, 2012 which claims the benefit of German Patent Application No. DE 10 2011 055 892.6 filed Nov. 30, 2011 and German Patent Application No. DE 10 2012 111 467.6 filed Nov. 27, 2012. The entire disclosures of the above applications are hereby incorporated herein by reference.

TECHNICAL FIELD

The invention relates to a ball valve, particularly for use in motor vehicle refrigerant circuits.

BACKGROUND OF THE INVENTION

Ball valves have an actuator, which drives a shaft mounted in a shaft bearing, which transfers the rotation to the valve element which is formed by a ball with a ball passage channel. The components are mounted in a valve housing, and ball valves are considered robust and cost effective and they are used for numerous applications.

In modern refrigerant systems for motor vehicle air conditioners, modern functionalities are increasingly integrated, which are associated with high demands on the individual components of the respective refrigerant system. For example, it is desirable to integrate a heat pump functionality in the design of motor vehicle refrigerant systems. For this purpose, it is necessary to provide the components that are used, particularly the valves and the expansion devices, with expanded functionalities. This leads, among other effects, to the valve being insertable bidirectionally relative to the refrigerant flow through the valve, and to the systems satisfying even particularly high demands in regard to the tightness of refrigerant systems in mobile applications.

To date, hardly any components suitable for practical use are available in the prior art, and consequently proven components have to be modified and adapted to the new challenges.

In the prior art, ball valves according to DE 24 30 409 A1 are known, for example, which are adapted especially as components for fluid line arrangements, so as to satisfy the requirements in regard to tightness and ease of installation as well as optimization of the number of the individual components.

Very generally, ball valves are known to be associated with tightness problems relating to the so-called internal tightness, which concerns the flow of the fluid to be regulated with the valve. The external tightness relates to the tightness of the valve with respect to the environment of the valve, since the moving shaft used for the actuating movement of the valve body has to be sealed with respect to the environment, in order to prevent the discharge of the fluid to be regulated via the rotatably mounted shaft.

In refrigerant systems, additional demands are placed on the valves, since the components also are exposed to very high temperature and pressure differences. In that regard the seals in particular have to be adapted to meet very high demands due to the thermal stresses and the material shrinkage and respectively expansion that occur. Moreover, the problems are exacerbated by the particularly high demands placed on refrigerant-conducting systems used in mobile applications, such as motor vehicles, for example. This is reflected in the expectation of a very long useful life and functional capability of the components in mobile applications, for minimizing the discharge of refrigerant into the environment.

Thus, the aim of the invention is to produce a valve which has a very high tightness in regard to the external seal of the valve with respect to the environment, and which is suitable for use in refrigerant systems for motor vehicle air conditioners.

BRIEF SUMMARY OF THE INVENTION

The aim is achieved by the features of a ball valve as described hereinafter.

In particular, the aim of the invention is achieved by a ball valve having an external seal arrangement, which is particularly suitable for use in motor vehicle refrigerant circuits.

The ball valve consists substantially of an actuator, a shaft with shaft bearing, a ball with a ball passage channel as well as of a valve housing. The special feature of the ball valve according to the invention is that, in the shaft bearing, a fluid shaft seal is arranged between an upper mechanical shaft seal and a lower mechanical shaft seal, wherein the fluid shaft seal is formed by a cavity in which a sealing fluid is located. The sealing fluid surrounds the shaft in a sealing region. Thus, the sealing fluid is in contact with the shaft, so that, in the axial direction of the shaft, a sealing effect is present due to the sealing fluid. The cavity for the sealing fluid is formed at least partially by a diaphragm, and it is delimited on the shaft by the shaft seals, the upper shaft seal and the lower shaft seal. The diaphragm is formed in such a way that pressure can be applied to the side facing away from the sealing fluid, so that the pressure is transferred by means of the flexible diaphragm from outside of the sealing fluid space to the sealing fluid, and thus the pressure is the same on the two sides of the diaphragm.

An advantageous embodiment of the invention consists in that, in the valve housing, a chamber is formed, whose wall is partially formed by the diaphragm, wherein the system pressure of the fluid flowing through the ball valve is applied to the chamber. This ensures particularly advantageously that the pressure of the flowing fluid, which exists in the chamber, is transferred by means of the diaphragm to the sealing fluid, and thus that the sealing fluid and the fluid flowing through the ball valve have the same pressure.

For refrigerant circuits, it has been found to be particularly advantageous if, as sealing fluid, polyalkylene glycols are arranged in the cavity.

An additional advantageous embodiment of the invention is obtained when the internal shaft seal is implemented as an O ring, and designed without pressure difference for the media separation of the fluid flowing through the ball valve and of the sealing fluid. On both sides of the O ring, fluids of the fluid flowing through the ball valve and of the sealing fluid at the same pressure are thus located.

A variant of the invention consists in that the external shaft seal is implemented as an O ring or a molded seal and is designed with pressure difference for the media separation of sealing fluid and environment.

This allows the efficient production of an internal seal construction for the ball, which can particularly advantageously be mounted in a simple way and which is also easy to replace during repairs.

The design of the invention consists primarily in that the external seal of the ball valve is implemented by a double sealing system with enclosed sealing fluid reservoir; this means that oil as sealing fluid is provided for forming an intermediate seal between the refrigerant and the environment. The sealing fluid reservoir, also referred to as cavity, is designed at least partially as a diaphragm. In addition, a supplemental particular effect of pressure adaptation of the sealing fluid chamber to the pressure of the fluid flowing through the valve is consequently also achieved by means of this diaphragm.

The sealing fluid is preferably oil, which is selected depending on the refrigerant used and which is suitable for the refrigerant, and which thus also causes no damage in the refrigerant system in the case of leaks within this sealing system.

An additional advantage of the invention consists in that, in the ball valve, the actuator is a sufficient distance from the valve body due to spacing resulting from the shaft, so that the thermal stress on the electrical components of the actuator can be minimized, and operation at high temperature and also at low temperature is as a result also satisfactorily guaranteed.

The oil, as sealing fluid, thus forms an intermediate seal in the form of an oil pocket with a cavity for the sealing fluid, which is partially formed by a diaphragm. The valve type is suitable for producing two/two, three/two and four/two way valves by modifying the actuator and the ball geometry.

The actuator with the motor gearbox and the electronics is thermally separated from the valve, for example, by the distance between the actuator and the valve housing, by an insulating shaft made of poorly heat conducting material, such as ceramic, for example, or by special connecting elements made of temperature-resistant plastics, and thus it is practically at ambient temperature.

According to a particularly advantageous design of the invention, the diaphragm is designed as a ring shaped part. The ring shaped part is limited in the axial direction at the top by a collar flange and at the bottom by a contact ring, also referred to as contact surface, wherein, in the radial direction, the collar flange has a broader diameter and the contact ring has a narrower diameter.

The upper collar flange and the lower contact surface of the diaphragm are connected to one another by an axial lateral surface and a radial lower annular disk.

The cavity for receiving the sealing fluid is formed between the shaft, the upper collar flange, the axial lateral surface, the radial annular disk, and the lower contact ring.

It is preferable for the transition from the axial lateral surface to the radial lower annular disk to be implemented so that it is rounded toward the outside.

The ring shaped part limits in the radial direction the cavity for the sealing fluid by the axial lateral surface and in the axial direction downward by the connection of the lower contact surface to the lateral surface.

BRIEF DESCRIPTION OF THE SEVERAL VIEWS OF THE DRAWINGS

Further details, features and advantages of designs of the invention can be obtained from the following description of embodiment examples in reference to the associated drawings.

DETAILED DESCRIPTION OF THE INVENTION

Figure 1:
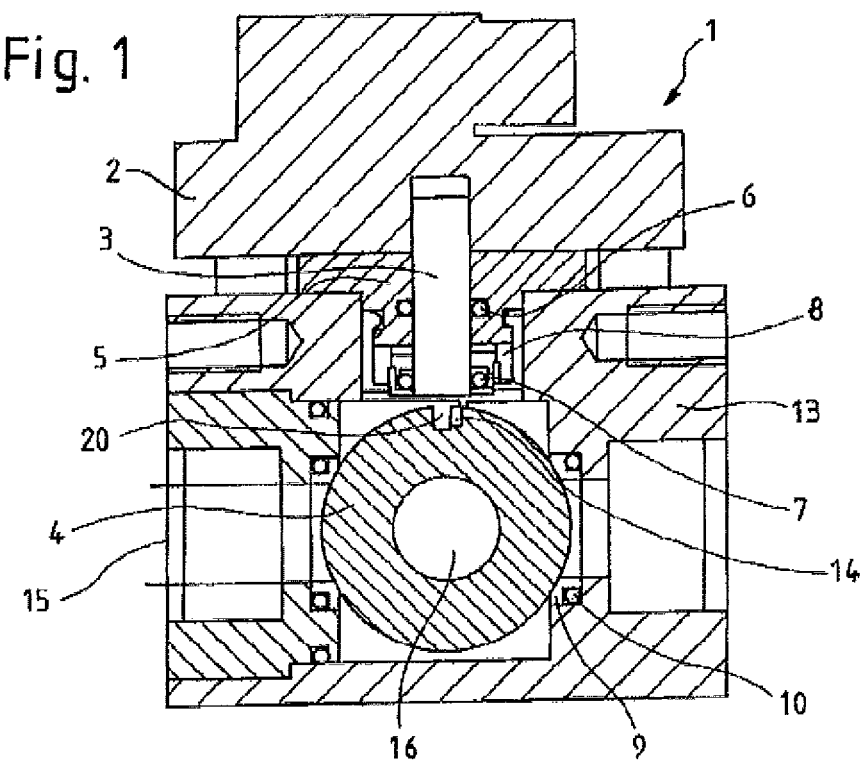
FIG. 1 shows: a cross section of a ball valve.

In FIG. 1, a ball valve 1 is represented in cross section with its essential components. The ball valve 1 has an actuator 2, which turns a shaft 3 depending on the desired degree of flow through the valve. The shaft 3 is connected by a lug 20, which engages in an engagement notch 14 of the ball 4. In the ball 4, the ball passage channel 16 is formed, through which the fluid flows, when the valve position of the ball valve 1 is open, from the inlet of the valve to the outlet of the valve.

The shaft 3 is rotatably mounted about its axis in a shaft bearing 5. The shaft bearing 5 has an external shaft seal 6 and an internal shaft seal 7, between which a fluid shaft seal 8 is formed. The seal arrangement of external shaft seal 6, internal shaft seal 7 and intermediate fluid shaft seal 8 is used to prevent the discharge of fluid flowing through the ball valve 1 as a result of play of the shaft 3 in the shaft bearing 5. This sealing system is also referred to as external double sealing system and it is important for the rate of leakage of the ball valve 1.

The ball 4, with regard to the internal seal, is located in or between two ball sealing seats 9, wherein the ball sealing seats 9 are floatingly mounted, by means of the wall housing 13, on a sealing seat ring 10. On the valve housing, refrigerant connectors 15 for the lines conveying refrigerant are provided.

Figure 2:
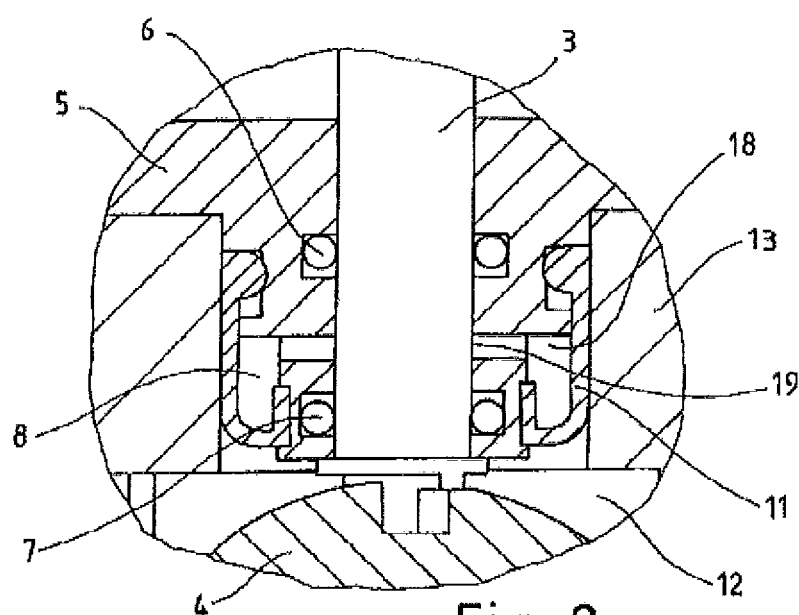
FIG. 2 shows: an enlarged representation of the shaft seal of a ball valve.

FIG. 2 shows an enlarged cross-sectional representation of the area of the shaft bearing 5 of the shaft 3 of the ball valve. It shows that the seal arrangement is formed by external shaft seal 6, internal shaft seal 7, and intermediate fluid shaft seal 8. The fluid shaft seal 8 is formed by a sealing fluid-filled cavity 18, which is limited at least partially by a diaphragm 11. The diaphragm 11 is held between the valve housing 13 and the valve shaft 5 at its upper end and it is designed in the form of a sleeve. The sealing region 19 of the shaft 3 is wetted with the sealing fluid. In the region of the bearing of the ball 4, a chamber 12 is formed, which is filled with the fluid flowing through the valve. The fluid flowing through the ball valve 1, that is in particular the refrigerant of the refrigerant circuit, has a certain pressure, depending on the site of use and the operating state of the refrigerant system, which is also the pressure existing in the chamber 12 of the ball valve 1. Between the chamber 12 and the sealing fluid-filled cavity 18, the diaphragm 11 is located, as a result of which the pressure of the fluids in the adjacent cavities, which are in each case filled with fluid, of the chambers 12 and of the cavity 18, is equalized. Thus, the internal shaft seal 7, which is designed as an O ring, is surrounded on both sides with fluids at the same pressure. From the side of the chamber 12, with refrigerant at the corresponding pressure of the zone in which the ball valve 1 is arranged, and, in a manner corresponding to this, from the other side of the internal shaft seal 7, the sealing fluid, which is designed as a refrigerant-compatible oil and, due to the diaphragm 11 as described, it has the same pressure as the refrigerant.

The external seal arrangement thus consists of a first pressureless seal between two fluids and in a second seal of a fluid relative to the environment with the pressure difference of the refrigerant system relative to the environment.

The external shaft seal 6 is implemented, as represented, as an O ring or as a molded seal, and it is exposed to the pressure difference of the system pressure, which is applied to the sealing fluid, relative to the ambient pressure of the atmosphere surrounding the ball valve.

Figure 3A:
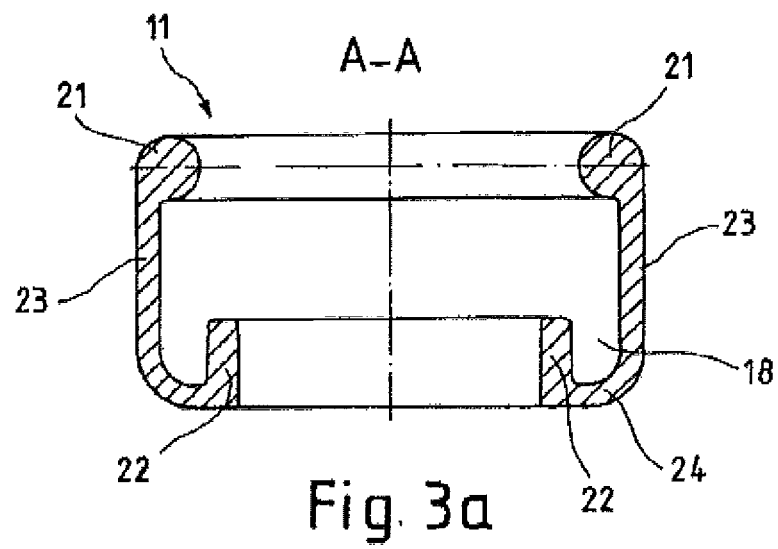
FIG. 3a shows: an axial sectional representation through the diaphragm.
Figure 3B:
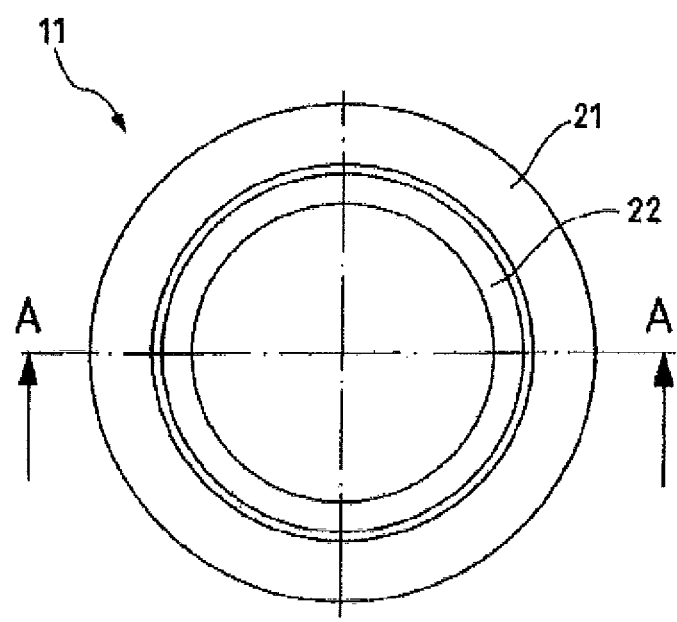
FIG. 3b shows: a top view of the diaphragm

In FIGS. 3a and 3b, representations of the diaphragm 11 are shown. FIG. 3a here shows an axial section A-A through the diaphragm 11, which is implemented so as to be rotationally symmetrical in the form of an annular sleeve. The annular sleeve is closed off in the axial direction at the top by the collar flange 21. The collar flange is shaped like an O ring and it engages with positive fitting into a corresponding groove of the shaft bearing 5. On the outer circumference of the collar flange 21, the axial lateral surface 23 adjoins in the axial direction, transitioning as a circular cylindrical surface at the lower end into a radial annular disk 24. The transition from cylindrical lateral surface 23 into the radial annular disk 24 is implemented so that it is rounded. The radial annular disk 24 transitions into the contact ring 22, which is designed as a cylindrical contact surface for the shaft bearing 5. The radial annular disk 24 forms the lower termination of the annular sleeve in the axial direction and the contact ring 22 extends upward. As a result, a sack-like contour in cross section is generated, which receives the sealing fluid. The sealing of the sealing fluid-filled cavity 18 with respect to the shaft bearing 5 is implemented by means of the collar flange 21 and the cylindrical contact ring 22. The sealing fluid-filled cavity 18 is limited radially in the interior by a lateral surface of the shaft 3, also referred to above as sealing region 19 of the fluid shaft seal 8 of the shaft 3. The sealing relative to the shaft 3 is implemented by the external shaft seal 6 with respect to the environment and by the internal shaft seal 7 with respect to the fluid flowing through the ball valve 1.

In FIG. 3b, the diaphragm 11 is shown in top view, and the upper collar flange 21 and the front surface of the lower contact ring 22 are represented and labeled. The upper collar flange 21 is formed with a larger diameter in comparison to the diameter of the contact ring 22, so that the collar flange 21 is indicated as broader and the lower contact ring 22 as narrower.

Figure 4:
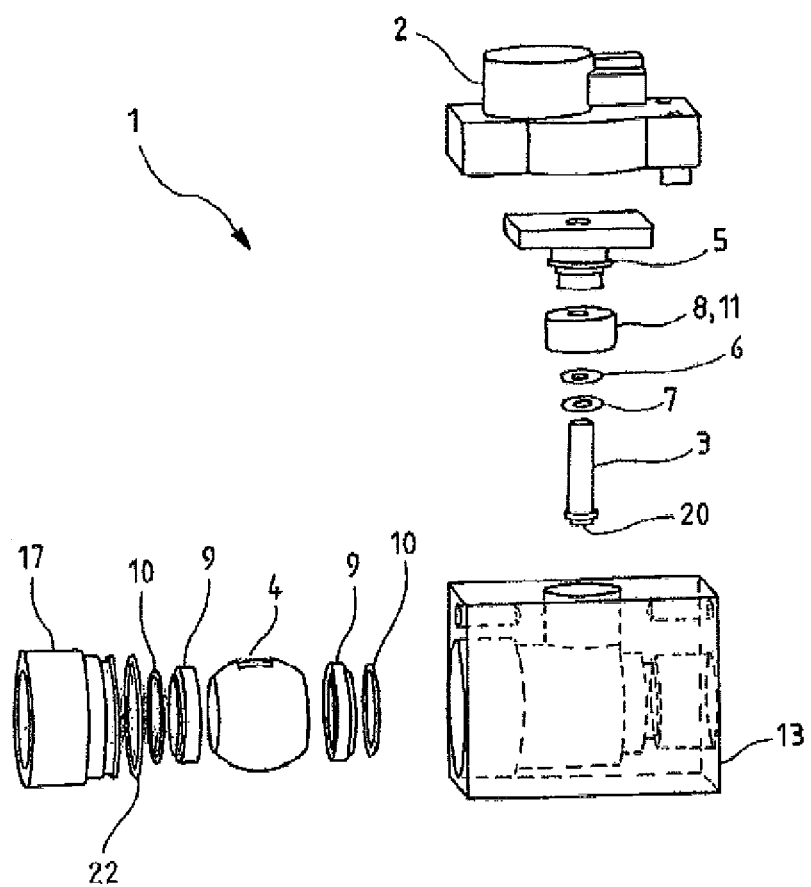
FIG. 4 shows: an exploded view of a ball valve with its essential components.

In FIG. 4, a ball valve 1 is shown in an exploded representation. The main components, the actuator 2, the valve housing 13, the shaft 3 as well as the ball 4 are completed by the bearing components for the shaft 3 with the shaft bearing 5, the associated external and internal shaft seals 6 and 7, and the fluid shaft seal 8 with the diaphragm 11. The ball 4 is mounted in the represented design with ball sealing seats 9 which are located opposite one another and which in turn are sealingly mounted by means of a sealing seat seal 10 with respect to the valve housing 13 or, on the other side, with respect to the closing device 17.

In the shaft bearing 5, the corresponding recesses for the collar flange 21 and for the contact ring 22 are formed.

LIST OF REFERENCE NUMERALS

1 Ball valve
2 Actuator
3 Shaft
4 Ball
5 Shaft bearing
6 External shaft seal
7 Internal shaft seal
8 Fluid shaft seal
9 Ball sealing seat
10 Sealing seat seal
11 Diaphragm
12 Chamber
13 Valve housing
14 Engagement notch
15 Refrigerant connector
16 Ball passage channel
17 Closing device
18 Sealing fluid-filled cavity
19 Sealing region
20 Lug
21 Collar flange
22 Contact ring
23 Axial lateral surface
24 Radial annular disk

The invention claimed is:

1. A ball valve (1) having an external seal arrangement having an actuator (2), a shaft (3) with a shaft bearing (5), a ball (4) with a ball passage channel (16) as well as a valve housing (13), characterized in that in the shaft bearing (5) a fluid shaft seal (8) is arranged between an upper shaft seal (6) and a lower shaft seal (7), wherein the fluid shaft seal (8) is formed by a cavity (18) in which a sealing fluid is provided, and in that the sealing fluid is in contact in a sealing region (19) with the shaft (3), so that, in the axial direction, a sealing effect due to the sealing fluid exists, wherein the cavity (18) is formed at least partially by a diaphragm (11) and delimited on the shaft (3) by the shaft seals (6, 7), and in that the diaphragm (11) is formed in such a way that pressure can be applied to the side facing away from the sealing fluid.

2. The ball valve (1) according to claim 1, characterized in that, in the valve housing (13), a chamber (12) is formed, whose wall is formed partially by the diaphragm (11), wherein the system pressure of the fluid flowing through the ball valve (1) is applied to the chamber (12).

3. The ball valve (1) according to claim 1, characterized in that polyalkylene glycols, as sealing fluid, is arranged in cavity (18).

4. The ball valve (1) according to claim 1, characterized in that the internal shaft seal (7) is implemented as an O ring and it is formed without pressure difference for the media separation of the fluid flowing through the ball valve (1) and of the sealing fluid.

5. The ball valve (1) according to claim 1, characterized in that the external shaft seal (6) is implemented as an O ring or as a molded seal, and is designed with pressure difference for the media separation of sealing fluid and environment.

6. The ball valve (1) according to claim 1, characterized in that the shaft (3) is formed from a poorly heat-conducting material.

7. The ball valve (1) according to claim 1, characterized in that the diaphragm (11) is designed as a ring shaped part with a broader upper collar flange (21) and a narrower lower contact ring (22).

8. The ball valve (1) according to claim 7, characterized in that the upper collar flange and the lower contact ring of the diaphragm (11) are connected to one another by an axial lateral surface and a radial lower annular disk.

9. The ball valve (1) according to claim 8, characterized in that the cavity (18) is designed for receiving the sealing fluid between the shaft (3), the upper collar flange, the axial lateral surface, the radial annular disk, and the lower contact ring.

10. The ball valve (1) according to claim 8, characterized in that the transition from the axial lateral surface to the radial lower annular disk is implemented so that it is rounded toward the outside.

* * * * *